May 17, 1949.    R. W. SUHL ET AL    2,470,531
WAGON TONGUE HITCH
Filed Oct. 2, 1946
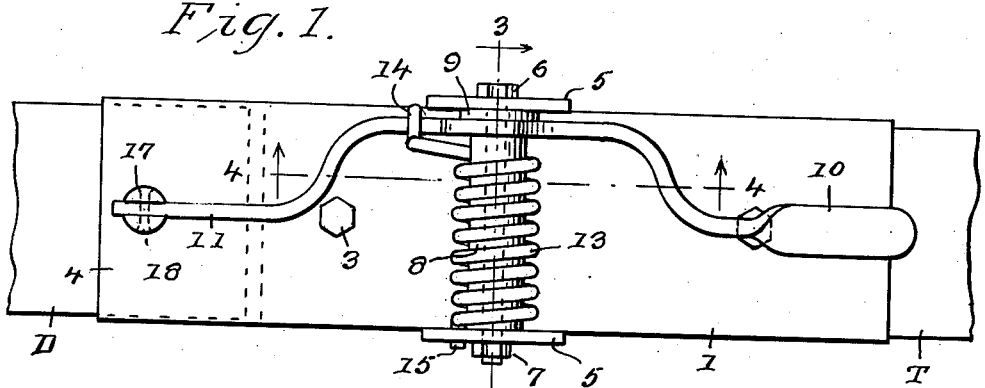
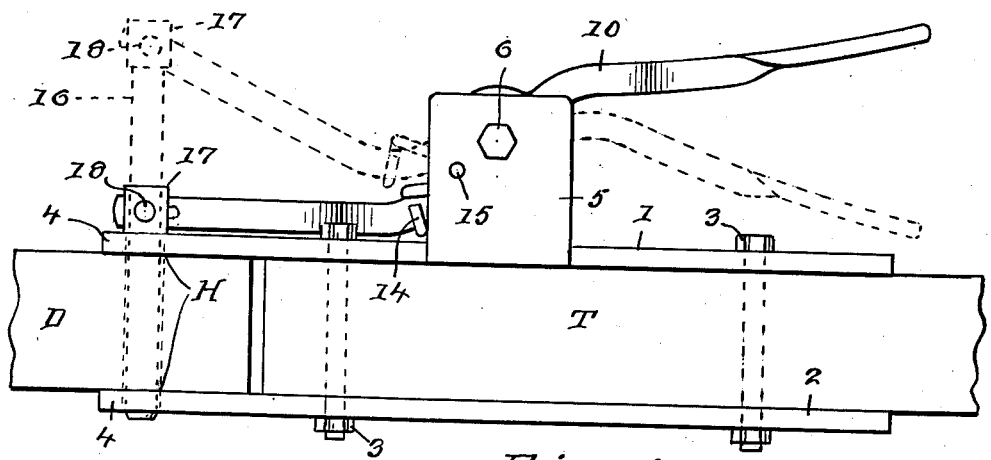
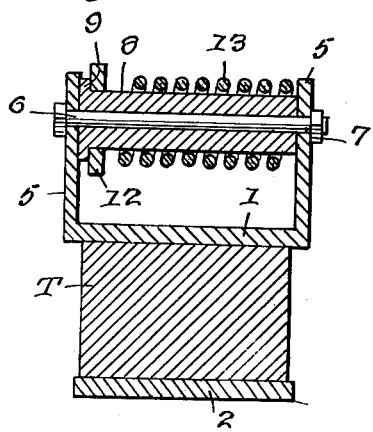
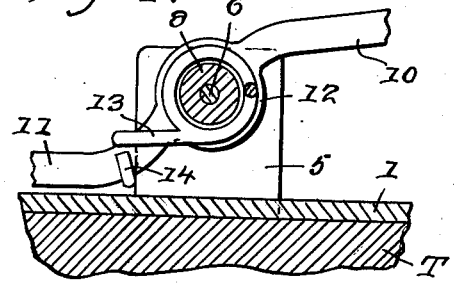
INVENTOR.
Richard W. Suhl
Elmer C. Marxmiller
BY *Victor J. Evans & Co.*
ATTORNEYS Patented May 17, 1949

2,470,531

UNITED STATES PATENT OFFICE 2,470,531

WAGON TONGUE HITCH

Richard Warren Suhl, Sullivan, and Elmer C. Marxmiller, Arthur, Ill.

Application October 2, 1946, Serial No. 700,760

1 Claim. (Cl. 280—33.15)

Our present invention relates generally to improvements in couplings for land vehicles, and more specifically to an improved wagon tongue hitch of the manually operated quick detachable type adapted for coupling a trailing vehicle to a towing or draft vehicle. The draft vehicle may be an automotive vehicle as a tractor or power operated truck, or a horse-drawn vehicle; and the trailing vehicle may be a van, or a wagon, wheeled agricultural implement, or similar vehicle.

The primary object of the invention is the provision of a quick detachable coupling that is automatically closed and manually disengaged, and which is composed of a minimum number of parts that may be manufactured at lost cost of production and assembled with facility to provide a durable, safe, and effective appliance that is simple in construction and operation.

The invention consists in certain novel combinations and arrangements of parts in a lever-operated coupling as will hereinafter be described and more specifically set forth in the appended claim.

In the accompanying drawings we have illustrated one complete example of the physical embodiment of our invention in which the parts are combined and arranged in accord with one mode we have devised for the practical application of the principles of our invention. It will, however, be understood that changes and alterations are contemplated and may be made in these exemplifying drawings and mechanical structures, within the scope of our claim, without departing from the principles of the invention.

Figure 1 is a top plan view of a vehicle coupling or wagon hitch in which our invention is physically embodied.

Figure 2 is a view in side elevation of the appliance of Fig. 1, showing by dotted lines the operation of the manually controlled lever for the coupling.

Figure 3 is a detail transverse vertical sectional view at line 3—3 of Fig. 1; and Figure 4 is a detail longitudinal sectional view at line 4—4 of Fig. 1.

In carrying out our invention as indicated in the drawings, and for a clear understanding of the relation and utility of parts, the draft member marked D may be the draw bar or draft bar of a horse drawn vehicle, or of an automotive vehicle, which is provided with a vertically arranged coupling socket or hole H indicated by dotted lines. The tongue T is a forward extension of a wagon, wheeled agricultural implement, or other trailing vehicle, and these parts D and T are coupled together by our appliance as shown in the drawings.

The coupling appliance is mounted on the front end of the tongue T, and it includes a top metal plate 1 of flat rectangular shape, and a bottom plate 2, which plates are rigidly mounted on the tongue by means of bolts 3, 3. The forward or front ends of the plates project beyond the front end of the tongue, as at 4, 4, to form a recessed coupling head, or socket for the reception of the rear end of the draw bar D, and these projecting ends are drilled for holes H that register with the complementary hole in the draw bar D.

At its approximate longitudinal center, the top plate 1 is fashioned with a pair of spaced upstanding ears or brackets 5, 5, that may be integral with or welded to the opposite sides of the plate, to provide bearings for a pivot pin or bolt 6 that is mounted in the ears and secured by nut 7, and which extends transversely of the tongue.

The pin or bolt 6 affords a support for a cylindrical sleeve or bushing 8, that is fashioned with an exterior annular flange 9 at one end; and the bushing provides a pivotal mount for the spring-pressed, manually operated lever that it utilized in disengaging the coupling.

The lever, as indicated in the drawings, is bowed laterally, and fashioned with a compound curve in its vertical plane, and the rear arm 10 forms a handle while its front arm 11 provides a vertical lift; the fulcrum being a bearing head 12 that is mounted on the bearing sleeve or bushing next to the annular flange of the bushing.

The front or lifting arm of the lever is resiliently held or pressed down over the top of the top plate 1 by means of a helical spring 13 coiled about the bushing 8 with one end formed as a loop, or eye, 14 that surrounds the lifting arm of the lever, and the other end 15 of the spring is anchored in one of the bearing ears or brackets 5. Thus the spring tends to press down the lifting arm 11 and elevate the handle-arm of the lever, and to return these parts to normal position after the lever has been operated, and released.

For coupling the draw bar D and the tongue T, a vertically disposed pin 16, having a head 17, is mounted in the holes H of the spaced parts 4, 4, of the caulking head, and the complementary registering hole of the draw bar D.

The headed coupling pin is pivotally connected at 18 on the front end of the lifting arm 11 of the lever; and as indicated by dotted lines in Fig. 2 by manually bearing down on the handle-arm of the lever the coupling pin may quickly be lifted from the coupled parts, to release the vehicles.

For coupling the two vehicles, after the holes of the draw bar and of the coupling head have been brought into register, and with the lever in dotted position of Fig. 2, the lever is released, and the coupling pin is spring-pressed into the registering holes.

Having thus fully described our invention, what we claim as new and desire to secure by Letters Patent is:

A quick detachable tongue hitch comprising top and bottom plates adapted to be fitted respectively on the top and bottom of the tongue and to extend forwardly beyond the end thereof, the forward ends of said plates having holes and adapted to receive between them a draw bar having a hole therein, said top plate having projections extending upwardly from the sides thereof, a sleeve extended between the projections, means for securing the sleeve to the projections, a hand lever pivoted intermediate its length on said sleeve, said lever being bent to have its intermediate portion offset from its ends and to lie at the opposite side of the sleeve and adjacent one of the projections, and a coiled spring anchored to the lever at one end of the spring and to a side projection of the plate at the opposite end of the spring, said spring surrounding the sleeve and being extended over substantially the full length thereof, and a hitch pin secured to one end of the lever for alignment with the holes of the plate and with the hole of the draw bar, said spring being biased to hold the hitch pin in place, said lever being bent to form a compound curve in a vertical plane so that its forward portion when the lever is down and the hitch pin in place will lie parallel to and square with the top face of the top plate, said sleeve having an annular flange at one end and said spring urging the lever against said annular flange.

RICHARD WARREN SUHL.
ELMER C. MARXMILLER.

REFERENCES CITED

The following references are of record in the file of this patent:

UNITED STATES PATENTS

| Number | Name | Date |
|---|---|---|
| 854,196 | Brown | May 21, 1907 |
| 870,177 | Hurd | Nov. 5, 1907 |
| 1,448,950 | Uecker | Mar. 20, 1923 |
| 1,692,071 | Austin et al. | Nov. 20, 1928 |
| 2,155,782 | Bracht | Apr. 25, 1939 |

FOREIGN PATENTS

| Number | Country | Date |
|---|---|---|
| 438,659 | Germany | Dec. 22, 1926 |
| 688,160 | Germany | Feb. 14, 1940 |